(12) United States Patent
Wortham

(10) Patent No.: US 9,535,484 B2
(45) Date of Patent: Jan. 3, 2017

(54) EXTENDING RUNTIME WITH BATTERY RIPPLE CANCELLATION USING CPU THROTTLING

(71) Applicant: Jason Allen Wortham, Fremont, CA (US)

(72) Inventor: Jason Allen Wortham, Fremont, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 308 days.

(21) Appl. No.: 13/686,452

(22) Filed: Nov. 27, 2012

(65) Prior Publication Data

US 2013/0138984 A1 May 30, 2013

Related U.S. Application Data

(60) Provisional application No. 61/564,617, filed on Nov. 29, 2011.

(51) Int. Cl.
| | |
|---|---|
| *G06F 1/32* | (2006.01) |
| *G06F 1/26* | (2006.01) |
| *H05B 33/08* | (2006.01) |
| *G09G 3/34* | (2006.01) |

(52) U.S. Cl.
CPC ............. *G06F 1/3234* (2013.01); *G06F 1/26* (2013.01); *G06F 1/324* (2013.01); *G06F 1/3212* (2013.01); *G06F 1/3265* (2013.01); *G06F 1/3296* (2013.01); *H05B 33/0803* (2013.01); *G09G 3/3406* (2013.01); *Y02B 60/1217* (2013.01); *Y02B 60/1242* (2013.01); *Y02B 60/1285* (2013.01); *Y02B 60/1292* (2013.01)

(58) Field of Classification Search
CPC ....................................................... G06F 1/3212
USPC .......................................................... 713/323
See application file for complete search history.

(56) References Cited

U.S. PATENT DOCUMENTS

| | | | | |
|---|---|---|---|---|
| 4,816,937 | A | * | 3/1989 | Fukushima ................ 360/73.03 |
| 5,343,137 | A | | 8/1994 | Kitaoka et al. |
| 5,754,436 | A | | 5/1998 | Walsh et al. |
| 6,324,339 | B1 | | 11/2001 | Hudson et al. |
| 6,472,848 | B2 | * | 10/2002 | Stryker et al. ................ 320/135 |
| 7,183,723 | B2 | | 2/2007 | Yu et al. |

(Continued)

FOREIGN PATENT DOCUMENTS

| | | |
|---|---|---|
| CN | 102097831 | 6/2011 |

OTHER PUBLICATIONS

"Office Action Dated Mar. 4, 2016; Chinese Patent Application No. 201210596391.9", (Mar. 4, 2016).

(Continued)

*Primary Examiner* — Jaweed A Abbaszadeh
*Assistant Examiner* — Cheri Harrington
(74) *Attorney, Agent, or Firm* — Blakely Sokoloff Taylor & Zafman LLP

(57) ABSTRACT

Methods of extending runtime with battery ripple cancellation in a CPU based system by providing a CPU that includes an input pin capable of throttling the power consumed by the CPU responsive to the input of a throttling signal, sensing a ripple in the form of a decrease in voltage or an increase in current responsive to a load on a CPU power supply, and when the ripple exceeds a predetermined limit, providing a throttling signal to the input pin to throttle the CPU to reduce the ripple.

6 Claims, 3 Drawing Sheets

Response to brief CPU demand

(56) References Cited

U.S. PATENT DOCUMENTS

| | | | |
|---|---|---|---|
| 7,594,132 B2* | 9/2009 | Kim | 713/322 |
| 7,741,787 B2 | 6/2010 | Chen | |
| 8,037,326 B2* | 10/2011 | Burton et al. | 713/300 |
| 8,198,863 B1 | 6/2012 | Wortham | |
| 8,203,305 B1 | 6/2012 | Wortham et al. | |
| 8,421,364 B2 | 4/2013 | Archibald et al. | |
| 8,502,504 B1 | 8/2013 | Wortham | |
| 8,643,331 B1 | 2/2014 | Wortham et al. | |
| 2005/0289376 A1* | 12/2005 | Hartman et al. | 713/320 |
| 2006/0080559 A1* | 4/2006 | Sauber | 713/300 |
| 2010/0327835 A1 | 12/2010 | Archibald | |
| 2011/0084667 A1 | 4/2011 | Li | |
| 2012/0151242 A1* | 6/2012 | McGrath et al. | 713/340 |
| 2013/0002165 A1 | 1/2013 | Rouvala et al. | |
| 2013/0221869 A1* | 8/2013 | Volk et al. | 315/250 |

OTHER PUBLICATIONS

"Office Action Dated Oct. 17, 2016; Chinese Patent Application No. 201210596391.9", (Oct. 17, 2016).

* cited by examiner

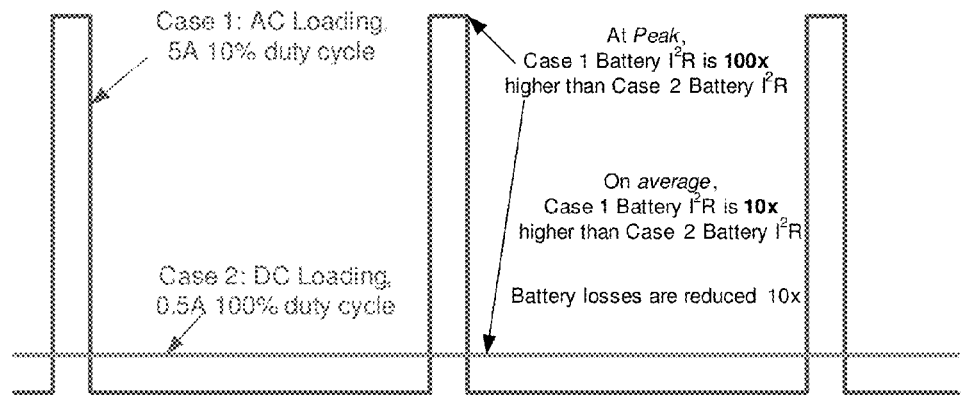
Figure 1: RMS Losses from pulsed loads vs. DC load
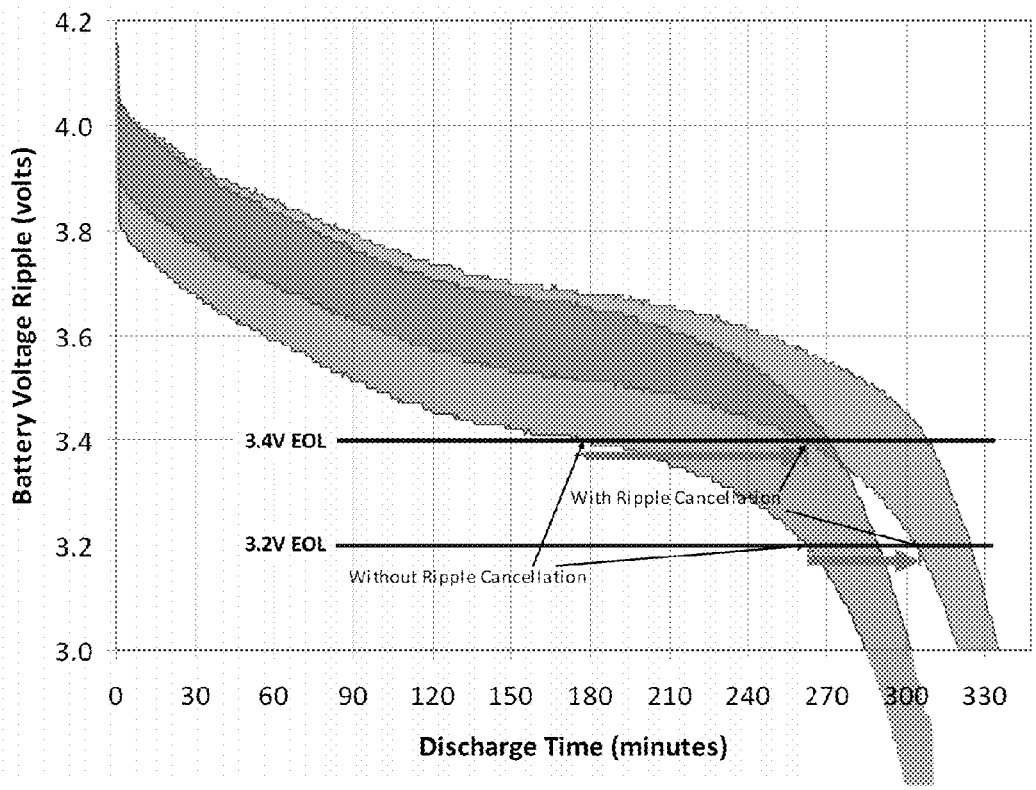
Figure 2: Run-time with and without ripple cancellation

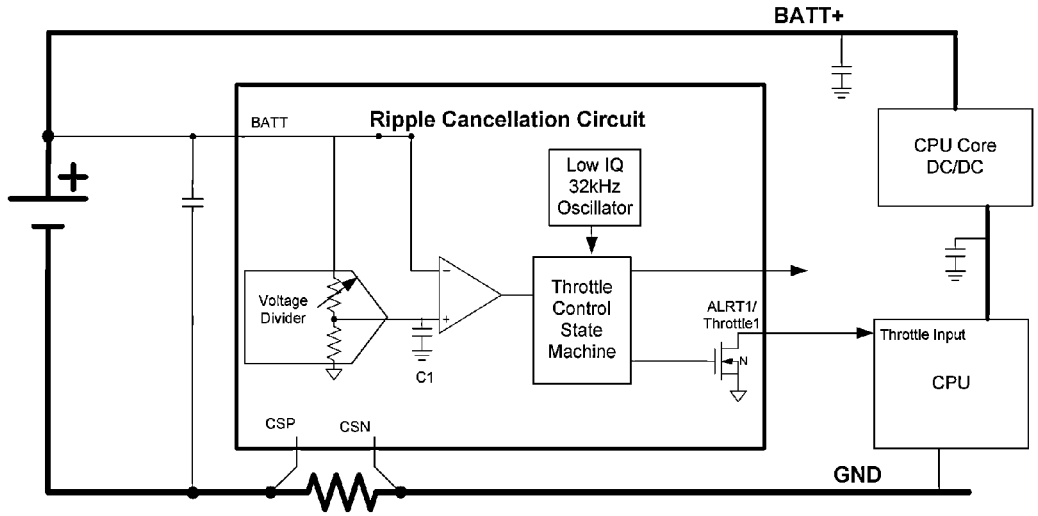
Figure 3: Circuit for throttling a CPU
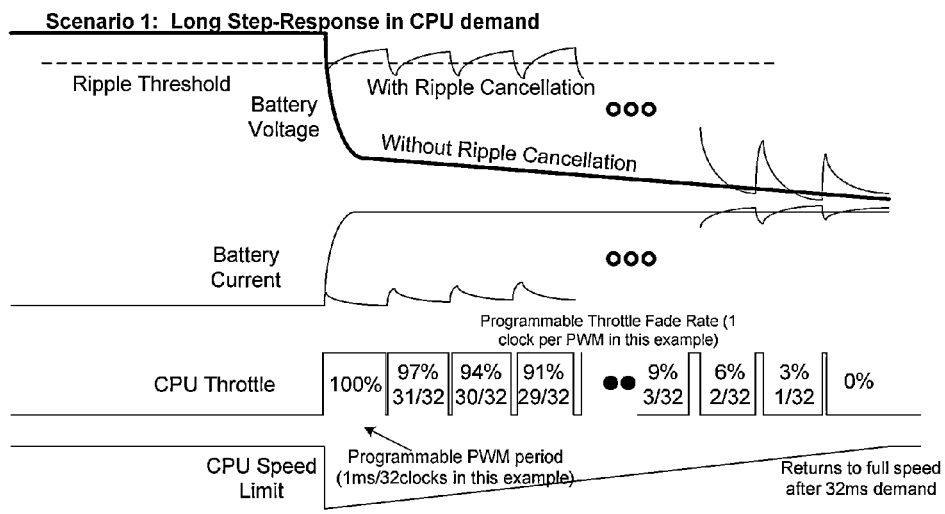
Figure 4: Long Step Response in CPU Demand

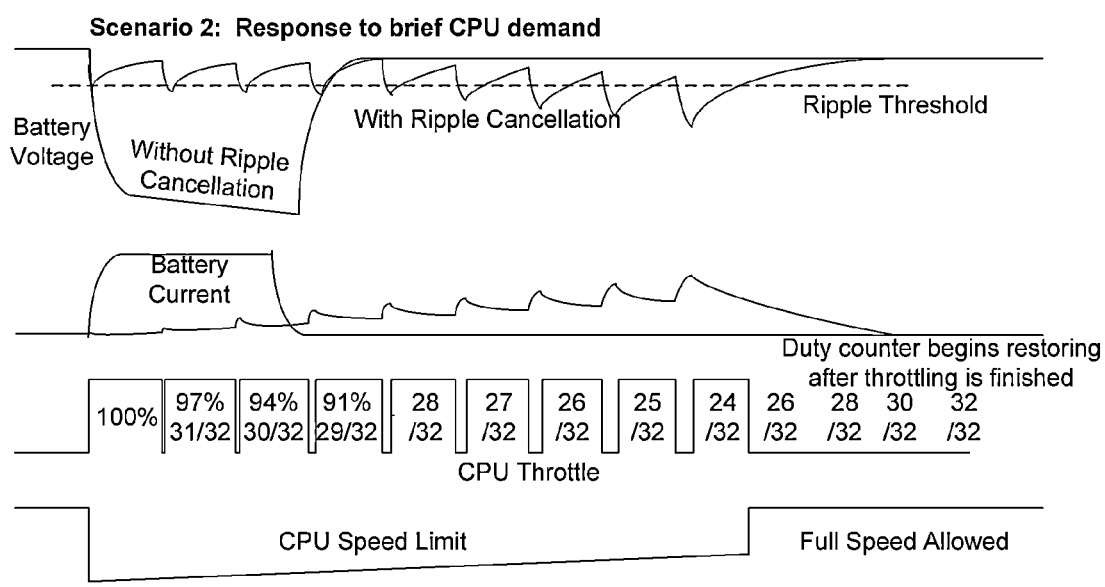
Figure 5: Response to brief CPU demand

US 9,535,484 B2

EXTENDING RUNTIME WITH BATTERY RIPPLE CANCELLATION USING CPU THROTTLING

CROSS-REFERENCE TO RELATED APPLICATIONS

This application claims the benefit of U.S. Provisional Patent Application No. 61/564,617 filed Nov. 29, 2011.

BACKGROUND OF THE INVENTION

1. Field of the Invention

The present invention relates to the field of battery life extension.

2. Prior Art

A battery operated device such as a CPU, RF radio, and LED generate load bursts in a highly discontinuous manner. Because the load is bursty, the battery sees a significant AC loading in addition to a continuous DC loading during usage. AC loading results in higher RMS ($I^2R$) losses in the battery and battery-path resistance. In addition, the resulting ripple causes the system to declare empty earlier and additional battery capacity remains unused.

BRIEF DESCRIPTION OF THE DRAWINGS

FIG. 1 is an illustration showing that battery ripple results in reduced energy delivered from the battery to the system.

FIG. 2 illustrates the results of an experiment using LED backlight control to cancel the ripple from a GSM radio.

FIG. 3 presents an exemplary circuit that could be used to throttle an Intel CPU, which has a PROCHOT pin intended for throttle control when the system is overheated.

FIG. 4 presents a timing diagram demonstrating an exemplary throttle behavior when the battery voltage undershoots the ripple target.

FIG. 5 is similar to FIG. 4, but illustrates the response of throttling to a brief CPU demand.

DETAILED DESCRIPTION OF THE PREFERRED EMBODIMENTS

As used herein and in the claims to follow, references to a CPU are used in a general sense, and include processors, digital signal processors and single chip computers.

Battery ripple results in reduced energy delivered from the battery to the system. This is because the RMS current from a pulsed load is higher on average compared to the RMS current from an equivalent DC load, as shown in FIG. 1. Higher RMS currents result in higher $I^2R$ losses due to the battery's resistance. In the example shown, a 5 amp loading with a 10% duty cycle is compared to a 0.5 amp load with a 100% duty cycle. For the 5 amp loading with a 10% duty cycle, the $I^2R$ losses are $(5)^2R(0.1)$, or 2.5 R, where the 0.1 is the 10% duty cycle and R is the source impedance. For the 0.5 amp loading with a 100% duty cycle, the $I^2R$ losses are $(0.5)^2R$, or 0.25 R, or only 10% of the losses for the 5 amp loading with a 10% duty cycle.

By intelligently controlling a CPU throttle to "smooth" out the resulting loading, the battery ripple and associated energy losses can be reduced. If properly controlled, CPU throttle control can cancel battery ripple in two different ways: soft-start the CPU to spread brief transient bursts, and coordinate CPU loading vs. radio and other loading. If the CPU throttle is time-limited to under 10 ms, then it will not result in a noticeable impact on user responsiveness (snappy-ness, which is different than steady CPU performance). The idea of CPU throttling for ripple reduction is fundamental and can be accomplished various ways, although it is described herein with respect to certain exemplary methods.

Pulsed loading occurs from many different sources, such as:

1. 3G/GSM radio. GSM Radio operates around 20% duty cycle with around 5 ms period. There is little or no flexibility to control the timing of this load, since it must synchronize with communication requirements.
2. LED Backlight Dimming. The backlight is often dimmed with a low frequency PWM. This load is somewhat flexible as long as the average brightness is not affected below 200 Hz. Any modulation at 50 Hz, for example, can be seen by the user as flicker, and must be avoided.
3. CPU & Graphics. Processor demand is often "bursty", which highest demands corresponding to user commands. For example, when the user clicks an icon, the CPU is called into demand to quickly launch an app. But CPU demand often settles after the app has loaded. This load is somewhat flexible, as long as peak CPU power is available in under 10 ms. Slower response affects the user's perception of device-responsiveness.

LED backlight can be controlled to partially cancel the ripple caused by the radio or the CPU. CPU power can be controlled to partially cancel the ripple caused by the radio or the CPU itself.

An experiment has been performed using LED backlight control to cancel the ripple from a radio. This experiment was performed on a 1:10 scale battery, backlight, and simulated GSM radio. The resulting performance is shown in FIG. 2 below. In FIG. 2, the lower light gray area represents the discharge time results without ripple cancellation. The upper gray area represents the results with ripple cancellation and the darker gray area represents an area of overlap between the two conditions. This experiment demonstrates significant run-time extensions: >35% extended runtime to 3.4V EOL (end of life) and 15% extended runtime to 3.2V EOL, assuming that the respective negative peak will trip a shutdown of the system.

Ripple Cancellation

Maxim Integrated Products, Inc. assignee of the present invention, manufactures and sell fuelgauges (battery state of charge monitoring devices) that are based on a battery voltage model in the form of an RC model (see U.S. Pat. Nos. 8,198,863 and 8,203,305). Such fuelgauges could extend their responsibility beyond monitoring the battery and also manage the utilization of the battery. Controlling battery efficiency is a natural evolution for the fuelgauges, at least in one incarnation of the invention.

There are several options for such a future ModelGauge™ integrated circuit to observe and control the battery ripple:

Current vs. Voltage. The goal of ripple cancellation is to reduce the RMS currents. However, either battery current or voltage can be controlled to achieve this objective. Neither method seems preferred. The methods disclosed in detail herein are voltage based, though could easily be adapted for use as current based by using the voltage across a sense resistor in line with the battery. For fuelgauges that include a coulomb counter, such a sense resistor is already present.

AC coupling vs. DAC Threshold. The ripple can be observed either through an AC coupling filter or with a simple DAC plus comparator. The DAC plus comparator is effectively like an AC-coupling-filter down to DC, whereas the AC-coupling-filter would effectively have a fixed frequency. The DAC threshold method is preferred since the ripple response transfer function could be designed completely in the digital domain, allowing for greater application flexibility.

Control Output: The throttle output signal could be analog, PWM, or a dithered bitstream (pulse-density-modulation). Since either of the digital methods can easily be converted to analog, either PWM or bitstream is preferred.

CPU Throttle and LED throttle. Ideally the IC could be used either to throttle control the CPU or the LED backlight part of the fuelgauge IC. A throttle control to a CPU would need to match the CPU throttle input, which might be a simple two state throttle/throttle input or could be a proportional input, depending on the throttle input pin characteristics used by the CPU manufacturer. A throttle/throttle input pin would put the CPU in a fully on mode or a low power or standby mode, while a proportional input might progressively disable, or put into a low power state, functions of the CPU or delay commands to devices coupled to the CPU that cause a high RMS level in the battery current. Note that turning off a CPU or putting it in a low power mode itself causes current ripple, though as shall subsequently be seen, such action would effectively be modulated in such a manner as to substantially reduce the current ripple, in part due to the capacitance of, and capacitance load on, the power line from the battery or batteries.

An exemplary circuit such as the circuit shown in FIG. 3 can be implemented, in this example, using a comparator, resistor-divider, and digital state machine. The state machine would manage the throttle response algorithm.

In FIG. 3, the comparator receives one input voltage directly from the battery, and a second input from the resistor divider as delayed or low pass filtered by capacitor C1. The capacitor will be at the voltage output of the resistor divider. If there is some high frequency ripple on the battery voltage, the capacitor voltage will seek the average battery voltage as divided down by the voltage divider. For a constant load on the battery, the input to the positive comparator terminal from the voltage divider will be lower than the undivided input on the negative terminal of the comparator. This will cause the comparator output to the throttle control state machine to be low. However when a sufficient step increase in the load on the battery is applied, the battery voltage will drop below the voltage on the positive terminal of the comparator as delayed by capacitor C1, causing the output of the comparator to go positive, indicating a need for CPU throttling to reduce the load on the battery.

Note from the foregoing description that the increment in battery voltage that will trip the need for throttling the CPU will generally is dependent primarily on the voltage divider parameters, and to a lesser extent on the capacitance of capacitor C1. Note also that the same result may be achieved in a fuelgauge operating under program control if the battery voltage is digitized using an analog to digital converter and then digitally filtered by an appropriate digital filter. Such an implementation has advantages in that a digitized value of the battery voltage may already be available, and the digital filter may perhaps be implemented using processing facilities already on chip, or at least added to the chip in firmware or processor form. Also such an implementation has the advantage of not requiring a resistor divider or a capacitor, and may have programmable parameters for the digital filter, whether implemented to digitally duplicate the analog system shown, or to implement some other digital filter suitable for the purpose. Actually, the method of the present invention may be added to a CPU chip itself using the input voltage to the chip (unless isolated from the battery voltage by a switching regulator) instead of battery voltage as an input, though this may not be desired for various reasons, including the fact that if similar ripple controls are implemented on other system resources, oscillations could occur that only increase ripple and cause excessive system noise, and perhaps premature shutdown of the system. Consequently a central ripple control system for controlling ripple caused by the CPU and other resources may be best to coordinate the ripple control. Further while the present invention has been described with respect to using battery voltage or CPU voltage input as the primary input, battery current or CPU input could also be used as desired, as in general, voltage ripple and current ripple are related.

If current ripple is used, signs are reversed, as a drop in battery voltage is a result of an increase in battery load current. However current ripple would be better to use if the CPU supply voltage is used and that supply is isolated from the battery voltage by a voltage regulator.

The digital throttle-control-state-machine will include a counter, and could use the following parameters:

PWM Period. This defines the period of the PWM throttle output, assuming that the throttle output is a PWM signal. Actually the form of the output will depend on the corresponding input the CPU is looking for, a PWM output working well for a CPU that can quickly respond to a throttle/throttle input. For a 32 kHz clock, this might be 1 ms, or 32 clocks.

Throttle Fade Rate. This defines the rate at which the throttle is released after throttling has begun. A default value might be 1 count/period. So for each 32-clock periods, the duty cycle drops by 1 clock, with the following progression: 32/32, 31/32, 30/32, . . . , 1/32, 0/32. This implies that the CPU would be soft-started to full power within 32 ms.

Throttle Return Rate. When the CPU has switched into its low-speed mode (throttle on), the current consumption will naturally reduce, and the battery voltage may return toward its relaxed level. However, if the CPU throttle is immediately released, the battery voltage will again collapse, which can result in an oscillation. This oscillation may be an acceptable mode of operation, but it also may be undesirable. Instead the PWM duty will increment by Throttle Return Rate during each PWM period. So when the throttle situation returns, it will not immediately return to 100% duty.

Throttle Control

The timing diagram of FIG. 4 demonstrates the throttle behavior when the battery voltage undershoots the ripple target. When the battery voltage initially exceeds the ripple threshold, the CPU is throttled with 100% duty cycle during the first 1 ms. For each additional 1 ms, the throttle is reduced by one, until eventually the throttle is released and the CPU is allowed to operate at full speed, to prevent from impacting the user experience.

The remaining resulting ripple current and voltage is dependent on the response time between the CPU throttle input and the resulting change in battery current. This response time is dependent on the following parameters: CPU response, DC/DC output capacitance, and battery capacitance. The PWM period should be chosen according to this response. If this response is very fast, a PWM period of 1 clock can be used. In this mode of operation, the throttle will oscillate between 0 and 1 to control the battery ripple around the threshold.

FIG. 5 is similar to FIG. 4, but illustrates the response of throttling to a brief CPU demand. When the CPU demand occurs, throttling begins as in FIG. 4 initially with full throttling, followed by a decreasing throttling. At what would have been the end of the brief CPU demand without ripple cancellation, the energy demand of the brief CPU demand has not been satisfied because of the throttling. Consequently the throttling continues to decrease until the energy demand has been met. This is shown at the end of the 24/32 pulse. At this time, the ripple will decrease so that the throttle control state machine no longer receives a high input, and therefore will stop the throttling, relieving the temporary load on the battery. At the same time, in one embodiment the Duty counter is not reset, but begins restoring its count. In this way, if satisfaction of the brief CPU demand is immediately followed by another brief CPU demand before the Duty counter has returned to 32/32, the cycle will repeat, but starting at a lower count (lower throttling) to more quickly satisfy the new demand.

Note that this can also be used for longer steps in CPU demand (FIG. 4), even though the full throttling has been reduced to no throttling. In essence, in FIG. 5, when the ripple falls below the predetermined limit while the throttling is being progressively reduced or has been fully reduced, then the throttling if any is stopped, and the then existing throttling, if any, is used as a prospective throttling which is progressively increased toward full throttling. If the ripple again exceeds a predetermined limit before the prospective throttling reaches full throttling, then throttling is reinitiated again starting at the then existing prospective throttling limit. This will reduce ripple when longer time loads are only shortly interrupted, and then return. Of course during throttling, if the ripple goes below the predetermined limit, or after throttling has been initiated proceeded to no throttling, the state machine could be reset, so as to be ready to restart from the full throttling condition.

Again, CPU throttling for ripple reduction is fundamental, though it has been described herein with respect to exemplary specific methods. CPU throttling to reduce the RMS content in a battery output may be carried out in various ways, including in hardware, firmware or under program control. References to the CPU power supply in the claims to follow may be to the battery supplying power to the CPU, the power supply terminal of the CPU or to some point there between.

While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A method for use in a CPU based battery powered system comprising:
   controlling ripple in the CPU based system by;
   providing a CPU that includes an input pin capable of throttling the power consumed by the CPU responsive to an input of a throttling signal to the input pin;
   sensing a decrease in voltage or an increase in current exceeding a threshold indicative of an increase in a load on a battery for the CPU; and
   when the decrease in voltage or the increase in current exceeding the threshold is sensed, providing the throttling signal to the input pin to throttle the CPU by a maximum throttling amount to reduce the load on the battery;
   successively decreasing the throttling signal until the throttling is fully reduced or until an increase in voltage or decrease in current falls below the threshold, which causes the throttling to stop, when the throttling is stopped a then existing throttling signal is progressively increased toward the maximum throttling amount and when the decrease in voltage or the increase in current exceeding the threshold on the battery is again sensed, the throttling is again initiated, but starting at the then existing throttling signal;
   the method extending run time of a CPU based battery powered system by reducing energy losses in the battery and battery-path resistance.

2. The method of claim 1 wherein throttling the power consumed by the CPU comprises changing operation of the CPU from a present power consumption level to a lower power consumption level.

3. The method of claim 2 wherein the throttling signal is a pulse width modulated signal.

4. The method of claim 3 wherein the pulse width modulated signal is pulse width modulated in increments.

5. A computer readable non-transitory storage medium having stored thereon a sequence of instructions which, when executed by a computer, will cause the computer to perform the following:
   sense a decrease in voltage or an increase in current responsive to a decrease in voltage or an increase in current exceeding a threshold on a battery for a CPU; and
   when the decrease in voltage or the increase in current exceeding the threshold on the battery is sensed, throttling the CPU by a maximum throttling amount by changing operation of the CPU from a present power consumption to a lower power consumption;
   successively decreasing the throttling until the throttling is fully reduced or until an increase in voltage or decrease in current falls below the threshold, which causes the throttling to stop, when the throttling is stopped a then existing value is progressively increased toward the maximum throttling amount and when the decrease in voltage or the increase in current exceeding the threshold on the battery is again sensed, the throttling is again initiated, but starting at the then existing throttling signal.

6. Apparatus for controlling ripple in a battery powered CPU based system to reduce energy losses in the battery comprising:
   the CPU having an input pin capable of reducing power consumed by the CPU responsive to an input of a throttling signal;
   a sensor to sense a decrease in voltage or an increase in current responsive to a decrease in voltage or an increase in current exceeding a threshold on a battery for the CPU; and
   a state machine to provide a throttling signal to the input pin to throttle the CPU by a maximum throttling amount when the decrease in voltage or the increase in current exceeding the threshold on the battery occurs;
   the state machine having a counter, the amount of throttling being responsive to a count of the counter, when the decrease in voltage or increase in current exceeding the threshold on the battery is sensed, the state machine provides a throttling signal to the CPU input pin and then reduces the throttling signal for successive time increments thereafter responsive to the count of the counter until the throttling is fully reduced or until an increase in voltage or decrease in current falls below the threshold, which causes the throttling to stop, when the throttling is stopped a then existing count of the counter is progressively increased toward the maximum throttling amount and the decrease in voltage or the increase in current exceeding the threshold on the battery is again sensed, the throttling is again initiated, but starting at the then existing count of the counter.

* * * * *